Nov. 24, 1925.

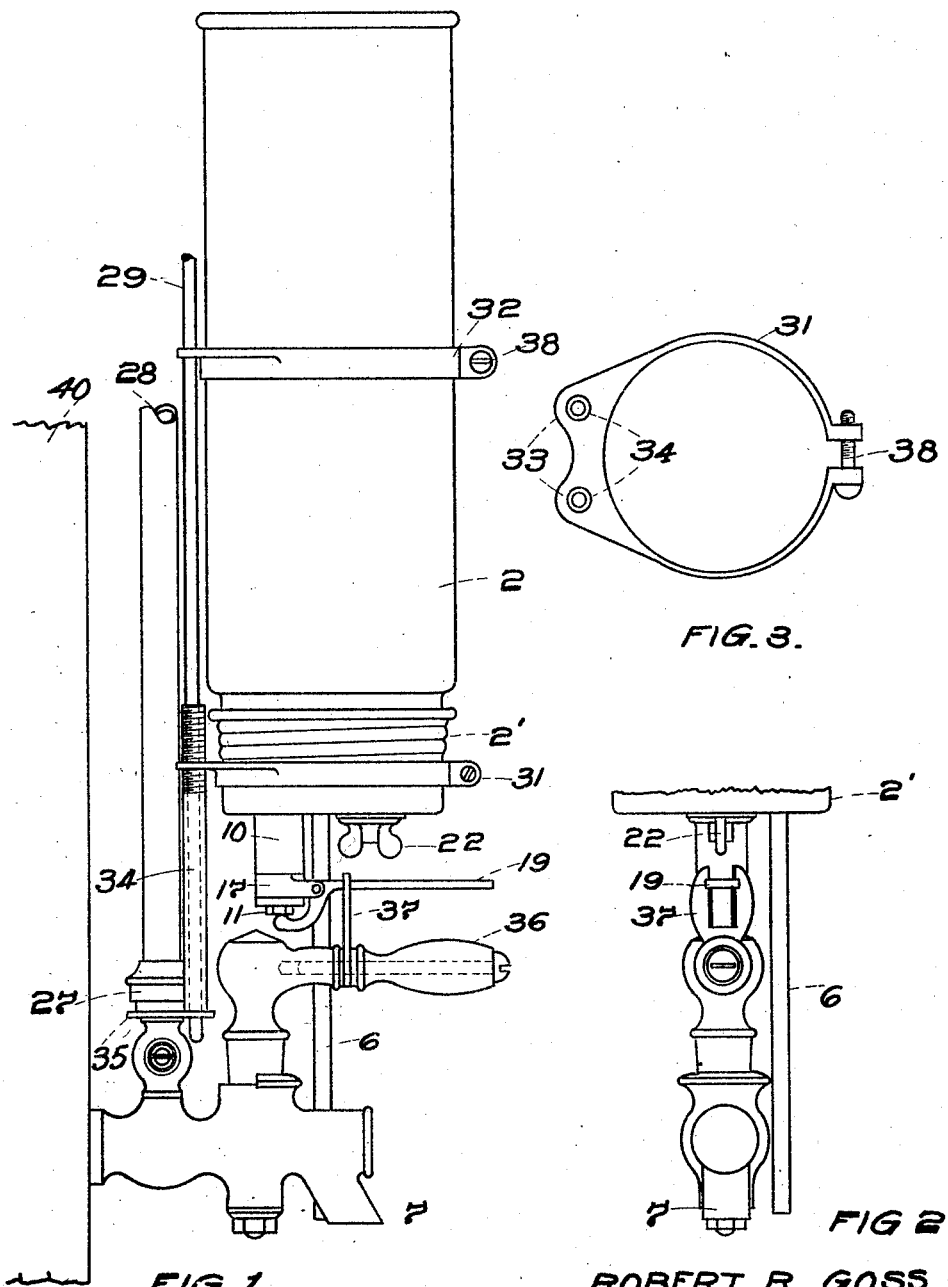

R. R. GOSS ET AL

CREAM DISPENSER

Filed Sept. 23, 1921        2 Sheets-Sheet 2

1,562,633

ROBERT R. GOSS
CHARLES H. GOSS  INVENTOR.

BY

Edward R. Inman
ATTORNEY.

Patented Nov. 24, 1925.

1,562,633

UNITED STATES PATENT OFFICE.

ROBERT R. GOSS AND CHARLES H. GOSS, OF FRANKLIN, PENNSYLVANIA.

CREAM DISPENSER.

Application filed September 23, 1921. Serial No. 502,783.

*To all whom it may concern:*

Be it known that we, ROBERT R. GOSS and CHARLES H. GOSS, citizens of the United States of America, residing at Franklin, in the county of Venango and State of Pennsylvania, have invented certain new and useful Improvements in Cream Dispensers, of which the following is a specification.

This invention relates to a cream dispenser which is adapted especially for use in connection with coffee urns, such as are used in restaurants and public eating places; said cream dispenser being so arranged that the cream may be drawn into the cup at the same time the coffee is drawn.

Since it becomes necessary to place the dispenser in close proximity to the coffee urn, where there is a comparatively high temperature, said dispenser is composed of suitable heat-insulating or non-conducting material, so that the contents of said dispenser may be kept at a suitably low temperature.

The objects of this invention are, to provide cream dispenser for coffee urns, whereby cream may be drawn into the cup at the same time the coffee is drawn; thus saving the time of performing a separate operation of introducing the cream; to provide a closed, sanitary container for the cream; and to provide means whereby the proportion of cream to coffee may be regulated as desired, so that uniformity of beverage may be maintained.

The construction of our improved cream dispenser is clearly illustrated in the accompanying drawings, in which:

Fig. 1 is a side elevation of our improved cream dispenser, showing a portion of a coffee urn and the way in which the dispenser is connected thereto.

Fig. 2 is a front elevation of the lower portion of said dispenser.

Fig. 3 is a detail.

Figures 4, 5, 6, 7:
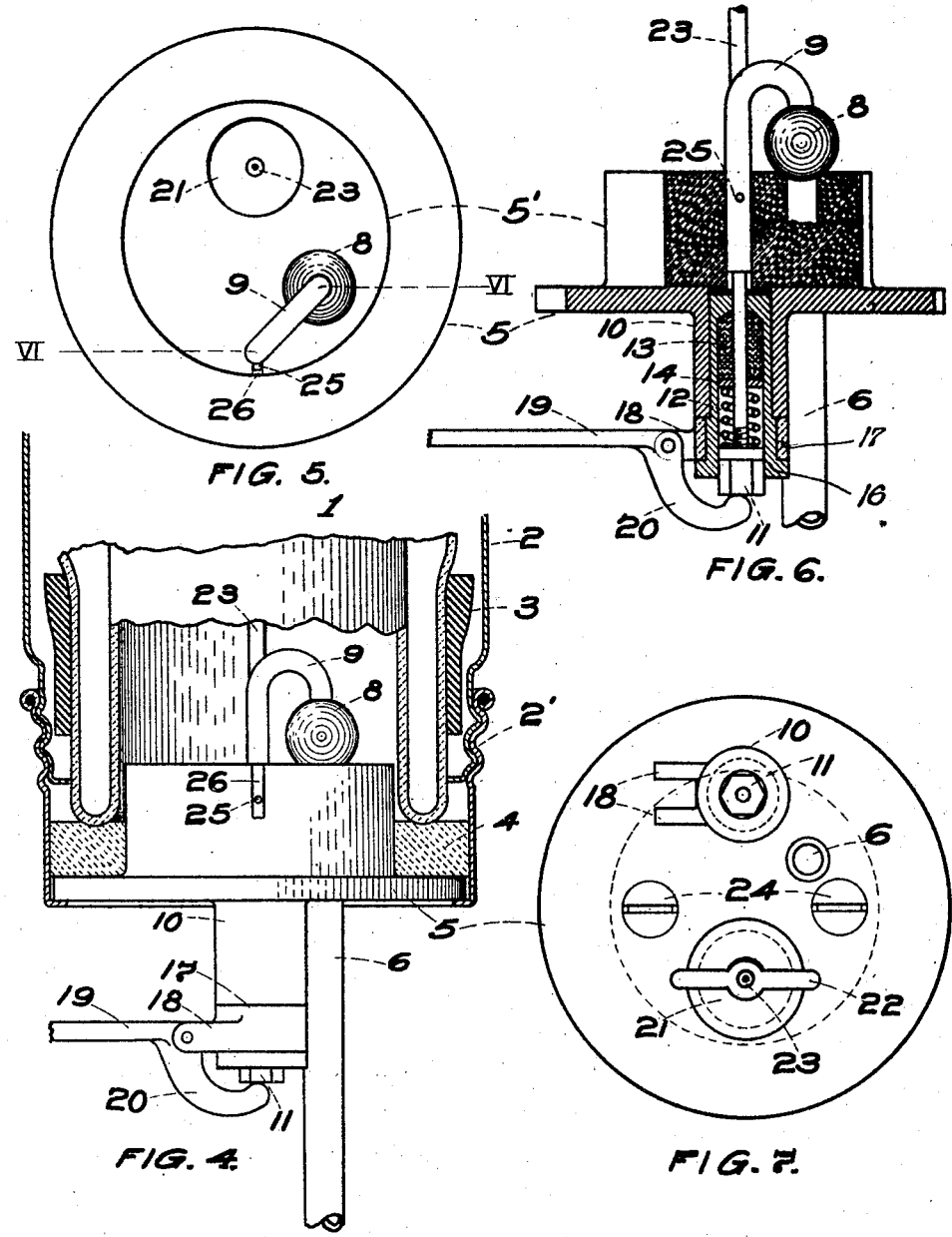
Fig. 4 is a central, longitudinal section of the lower portion of the dispenser, showing the base in elevation.
Fig. 5 is a plan view of the base.
Fig. 6 is a section of the base on line VI—VI of Fig. 5.
Fig. 7 is an inverted plan view of said base.

The construction, as illustrated in said drawings, is substantially as follows:

A container 1, Fig. 4, of the vacuum type, is provided for the cream. Said container is provided with a suitable metal jacket 2, between which and said container 1, suitable packing material is interposed, a portion of which is shown at 3. Said material 3 is usually a resilient collar which limits the longitudinal movement of said container within said jacket. A compression spring (as usual, and not shown) bears against the upper end of said container, whereby the mouth of same is caused to maintain sealed contact with gasket 4, composed of cork or other suitable material, and which is carried by the removable base 5 of the container. Said base 5 is provided with an outlet pipe 6, the lower end or outlet of which is positioned in close proximity to the mouth of the valve 7 of the coffee urn. A valve is provided for said pipe 6 and is constructed as follows: For the purpose of closing said pipe 6, a ball 8 is provided which is located within the container, and which is attached to a curved stem 9, the lower, outer end of which is positioned within a boss 10 carried by said base 5 so as to have longitudinal movement therein. The lower extremity of said stem 9 is screw-threaded and is provided with a nut 11. A stuffing-box 12 is formed in said boss 10, through which said stem passes, and a suitable packing material, as 13, surrounds said stem. A follower or washer 14 is placed against the lower face of said packing material; between said follower and the inner, opposing face of said nut, is interposed a compression spring 15, which performs two functions, namely, that of yieldably retaining valve 8 upon its seat, thus keeping it closed, and that of automatically keeping the packing material 13 suitably compressed, whereby leakage around said stem 9 is prevented.

It is pointed out that said stuffing box 12 is formed in a gland 16: This gland is secured within said boss 10, either by means of suitable screw threads, or it may be pressed in,—the drawings show the latter construction.

For the purpose of actuating said valve 8 the following elements are provided: The projecting end of said gland 16 carries a horizontally-revoluble or swivel collar 17 which is provided with the lever-lugs 18, 18, to carry the valve-actuating lever 19. The inner end of said lever 19 is formed into a finger 20, the end of which contacts with the lower face of nut 11, which is carried,—as previously stated—by the lower end of said stem 9; by adjusting said nut inwardly or outwardly, the extent of actuation caused by said finger 20 may be varied as desired, and thus the extent of the opening of valve 8 is also regulated for the purpose of gauging the amount of cream that will flow from the dispenser while a cup of beverage is being drawn.

The container 1 is filled through a port 21 in the base, and said port is closed by a suitable plug or closure 22 which carries a vent-pipe 23, that extends upwardly within said container with its upper open end positioned in close proximity to the top thereof.

The base 5 is attached to the jacket 2 by means of a screw-ring 2'. Said base preferably consists of a metallic portion 5, and a heat-insulating member 5', which is preferably composed of vulcanized fiber. Said members 5 and 5' are shown as being secured together by means of the screws 24. A pin 25 carried by said stem 9 and operating in slot 26, prevents said stem 9 from turning, and retains valve 8 in proper seating alinement with its seat.

The dispenser is here shown as being attached to the coffee urn in the following manner: The stop-cock, or dispensing valve 7 of the coffee urn is provided with a member of a fitting or fixture—as 27 for carrying a gauge glass 28, also the usual guard rods for such glass, as 29.

Two compression hoops, as 31 and 32, are mounted upon any suitable part of the jacket 2, or the screw-ring 2', and are firmly clamped thereon by means of the screw 38. The lower ring 31 is shown in plan view in Fig. 3, and as illustrated is provided with two eyes 33, which are positioned and adapted to receive said guard rods 29. Said eyes 33 are each internally screw-threaded for the reception of a screw-threaded tube 34, which is screwed into said eyes.

The band 32 is substantially the same as band 31, except that it is not provided with the tubes 34.

To mount the dispenser upon a coffee urn, 40, the rods 29 are removed, the dispenser is placed in the position shown, and said rods 29 are placed so as to pass through the eyes of band 32 and the tubes 34. The lower ends of said tubes 34 now rest upon the flange 35, and the receiver is thus securely retained in position. Vertical adjustment of the dispenser may be made by turning said tubes 34 to cause the screw-threads thereon to operate, thus raising or lowering the dispenser, for the adjustment of lever 19 into suitable proximity to lever 36.

The valve lever or handle 36 of the coffee urn is provided with a vertically-disposed fork 37 for the reception between the prongs therof of the handle 19 whereby said handle 19 is automatically caused to retain the proper position relative to handle 36, so that said handles are always in proper relation and easily manipulated simultaneously. The swivel collar permits the handle 19 to swing horizontally whereby it is adapted to follow the movements of said handle 36.

Inasmuch as our improved cream dispenser is adapted to be used in close proximity to a coffee urn, where the temperature is comparatively high, the contents of the container must be protected from the heat, and it is for this reason that the valve 8 is located within the container 1. If said valve were located outside of said container, and any amount of cream were permitted to remain for intervals in the outlet tube 6, it would soon curdle and stop the outlet, as well as impair the quality of the cream.

We claim the following:

1. The combination with a coffee urn provided with a dispensing valve and a dispensing lever operable to open and close said valve, of a cream container of the vacuum type removably carried by said urn, a cream-delivery pipe for said container having its delivery end positioned in proximity to the delivery of said valve, a valve operable to control the delivery of cream through said delivery pipe, a cream-dispensing lever for said valve of said container positioned and maintained in juxtaposition to the dispensing lever for said urn, means maintaining said cream-dispensing lever in said juxtaposition to said dispensing lever of said urn, and venting means for said container.

2. The combination with a coffee urn provided with a dispensing valve and a dispensing lever operable to open and close said valve, a cream container of the vacuum type removably carried by said urn, a cream-delivery pipe for said container having its delivery end positioned in proximity to the delivery end of said valve, a valve operable to control the delivery of cream through said delivery pipe, a lever operable to open said valve of said cream container positioned in parallel juxtaposition to the dispensing lever of said urn and operable simultaneously therewith, means maintaining said ceram-dispensing lever in said juxtaposition to said dispensing lever of said urn, and venting means for said container.

3. The combination with a coffee urn provided with a dispensing valve and a dispensing lever operable to open and close said valve, a cream container of the vacuum type carried by said urn in an inverted position, delivery means arranged to deliver cream from said container adjacent the delivery point of said urn dispensing valve, a valve for said delivery means operable to control the delivery of cream from said cream container, a horizontally swinging lever operable to open said valve of said cream container positioned and maintained in parallel juxtaposition to the dispensing lever of said urn and coordinately operable therewith whereby the simultaneous delivery of fluid from said valves is effected, means maintaining said cream-dispensing lever in said juxtaposition to said dispensing lever of said urn, and venting means for said container.

4. The combination with a coffee urn provided with a dispensing valve and a dispensing lever operable to open and close said valve, of a cream container of the vacuum type removably carried by said urn in an inverted position, delivery means arranged to deliver cream from said container adjacent the delivery point of said urn dispensing valve, a valve adjustable as to the extent of its opening arranged to effect the delivery of cream from said container, a cream-dispensing lever for said valve of said container positioned and maintained in juxtaposition to the dispensing lever of said urn, means maintaining said cream dispensing lever in said juxtaposition to said dispensing lever of said urn, and venting means for said container.

5. The combination with a coffee urn provided with a dispensing valve, of a vertically-adjustable cream container having heat insulating walls removably carried by said urn, a cream delivery pipe for said container having its delivery end positioned in proximity to the delivery of said valve, a valve operable to control the delivery of cream from said pipe, a cream dispensing lever for said cream container valve positioned in juxtaposition to the dispensing lever of said urn, means maintaining said cream dispensing lever in said juxtaposition to said dispensing lever of said urn, and venting means for said container.

6. The combination with a coffee urn provided with a dispensing valve and a dispensing lever operable to open and close said valve, of a vertically-adjustable cream container having heat-insulating walls removably carried by said urn, delivery means arranged to deliver cream from said container adjacent the delivery point of said urn dispensing valve, a valve arranged to control the delivery of cream from said delivery means, a cream dispensing lever for said valve of said container positioned and maintained in juxtaposition to the dispensing lever of said urn, means maintaining said cream-dispensing lever in said juxtaposition to said dispensing lever of said urn, and venting means for said container.

7. The combination with a coffee urn provided with a dispensing valve and a dispensing lever operable to open and close said valve, of a vertically-adjustable cream container having heat-insulating walls removably carried by said urn, delivery means arranged to deliver cream from said container adjacent the delivery point of said urn dispensing valve, a valve for said delivery means operable to control the delivery of cream from said container, a lever operable to open said valve of said cream container positioned in parallel juxtaposition to the dispensing lever of said urn and operable simultaneously therewith, means maintaining said dispensing lever of said cream container in said parallel juxtaposition to said dispensing lever of said urn, and venting means for said container.

8. The combination with a coffee urn provided with a dispensing valve and a dispensing lever operable to open and close said valve, of a vertically-adjustable cream container having heat-insulating walls removably carried by said urn, delivery means arranged to deliver cream from said container adjacent the delivery point of said urn dispensing valve, an automatically-closed valve for said cream delivery means adjustable as to the degree of its opening movement arranged to effect the delivery of cream from said container, a horizontally-swinging lever operable to open said valve of said cream container positioned and maintained in parallel juxtaposition to the dispensing lever of said urn and coordinately operable therewith whereby the simultaneous delivery of fluid from said valves is effected, means maintaining said dispensing lever of said cream container in said parallel juxtaposition to the dispensing lever of said urn, and venting means for said container.

In testimony whereof we affix our signatures.

ROBERT R. GOSS.
CHARLES H. GOSS.